C. P. LANDRETH.
PROCESS OF TREATING LIQUID.
APPLICATION FILED JUNE 10, 1914.
1,131,067.
Patented Mar. 9, 1915.
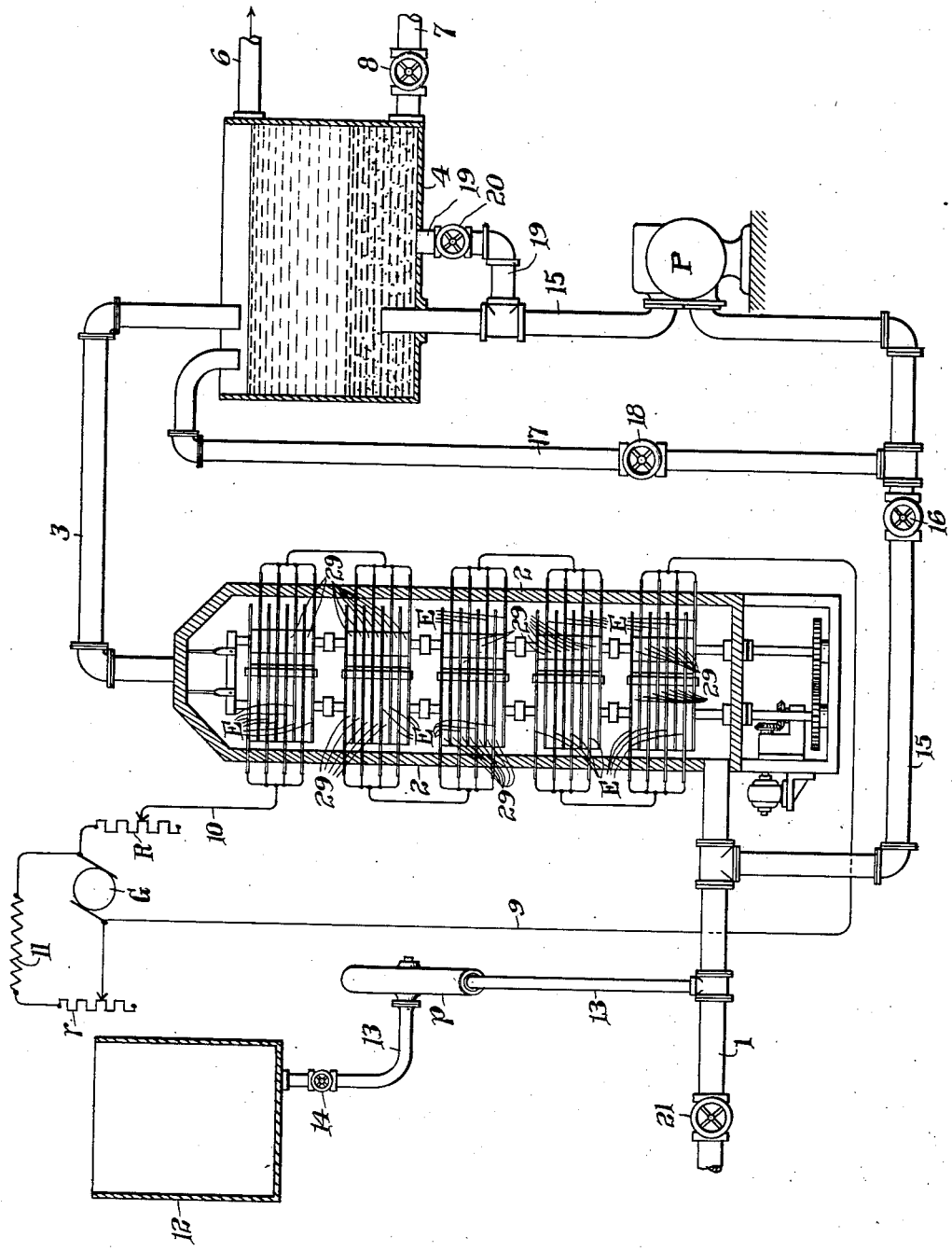
WITNESSES
Daniel Webster, Jr.
Nellie Field
INVENTOR
Clarence P. Landreth
BY Cornelius D. Ehret
ATTORNEY

UNITED STATES PATENT OFFICE.

CLARENCE P. LANDRETH, OF PHILADELPHIA, PENNSYLVANIA.

PROCESS OF TREATING LIQUID.

1,131,067.     Specification of Letters Patent.     Patented Mar. 9, 1915.

Application filed June 10, 1914. Serial No. 844,120.

*To all whom it may concern:*

Be it known that I, CLARENCE P. LANDRETH, a citizen of the United States, residing in Philadelphia, county of Philadelphia, and State of Pennsylvania, have invented new and useful Improvements in Processes of Treating Liquid, of which the following is a specification.

My invention relates to a process of precipitation from water, sewage or other liquid, matter held in suspension therein, either in the raw or untreated water, sewage or other liquid, or resulting from the electrolytic or electro-chemical treatment of the water, sewage or other liquid. The precipitation of such suspended matter from the liquid is brought about by coagulation, such as caused by the flocculant hydroxid from a metal electrode used in electrolytic apparatus, or by a flocculant formed simply by the reaction of chemicals upon each other in an electrolytic machine, as for example, hydrated calcium carbonate resulting from the electrical treatment of liquid containing carbonic acid gas, calcium or magnesium bicarbonate, in the presence of calcium hydrate.

By my invention, I pass the liquid to be treated through the electrolytic treating apparatus and the liquid, after electrical treatment, is delivered to a settling or sedimentation tank in which precipitation of the suspended matter by coagulation and flocculation occurs. There settles to the bottom of the tank the suspended matter together with the flocculant and coagulant, and this settled coagulant and flocculant, or a portion of it, I re-introduce into the liquid, either that in the electrolytic apparatus or that newly arriving in the sedimentation tank, with the result that the precipitation of suspended matter from the newly treated liquid occurs more rapidly and more effectively by the addition of this previously formed and acting coagulant and flocculant with resultant cheapening of the process of liquid treatment.

By my process an abundance of coagulant and flocculant is cheaply available, and for a given total coagulant and flocculant produced or required there is a saving in time and electrical energy for a given volume of liquid treated. For an illustration of one form of apparatus which may be used for carrying out my process reference may be had to the accompanying drawing, which is an illustration of a system for electrically treating liquid and precipitating suspended matter therefrom.

The raw liquid, water or sewage to be treated enters through pipe 1 into the electrolytic or electro-chemical treating chamber or tank 2, flows through the same and out through its top through pipe 3 into the settling or sedimentation tank 4 from which the clear treated liquid may be drawn off through pipe 6, a washout or drain pipe 7, controlled by valve 8, entering the tank 4 near its bottom.

Within the tank or treating chamber 2 are disposed, in groups, the electrodes E which are spaced and insulated from each other, and so disposed that the liquid passes in a zig-zag direction backwardly and forwardly across the chamber 2 between the electrodes, the liquid under treatment traversing the spaces between the electrodes a great number of times before passing out through the pipe 3. In the spaces between the electrodes may be disposed paddles 29 or other means rotating parallel to the face of the electrodes. Apparatus of this character is disclosed in prior U. S. Patent No. 1,095,893, granted to me May 5, 1914.

As here illustrated, the various groups of electrodes E are connected in series with each other, electrodes of the same polarity in a group being in parallel with each other. It is to be understood, however, that any other suitable arrangement of connections for the electrodes may be employed. The electric current is supplied by any suitable source, as for example, the generator G which is connected to the electrodes by conductors 9 and 10, a suitable adjustable resistance R being employed if desired. The field winding 11 of the generator may have included in its circuit the adjustable resistance $r$. An adjustment of either or both R or $r$ will change the amount of current passed through the liquid.

The nature of the material of the negative electrodes is generally unimportant and immaterial. The positive electrodes or anodes may be either attackable, as of iron, mild steel, copper, aluminum, etc., or they may be of unattackable material, such as carbon, depending upon the nature of the treatment to be effected.

Any re-agent to be added to the raw liquid may be provided in the re-agent tank 12 and introduced therefrom into pipe 1 by the pump P connected to the pipe 13, the latter controlled by valve 14.

The liquid is introduced, as stated, from pipe 1 into the chamber 2 where it receives the electrical treatment which may be an oxidizing treatment, or a treatment for removing from the liquid soluble incrustating salts, or a treatment for the production of flocculant formed either from the metal electrodes or from simple chemical reaction, or the latter stimulated by electric current; or any other treatment.

The treated liquid is delivered into the sedimentation tank 4 where the flocculant and coagulant precipitates and carries to the bottom the matter suspended in the liquid, such suspended matter being originally present in the liquid, or formed therein, as the result of the electrical treatment, or both. The coagulant or flocculant, as a hydroxid of the electrode metal or other flocculant chemically formed under the stimulation of the current is utilized in the tank 4 for the precipitation and sedimentation. And this collected coagulant or flocculant may be continuously or intermittently re-introduced into the pipe 1 through pipe 15, controlled by valve 16 and including the pump P for pumping the material into pipe 1. It then passes with the raw liquid through the electrolytic treating chamber 2 and hastens and more completely effects precipitation of matter suspended in the newly treated liquid, the previously used precipitant or flocculant passing again into the tank 4 and again settling and being again re-introduced into the chamber 2, and so on indefinitely.

Where the anodes are of metal, as iron or steel, and where the liquid to be treated contains an ionizable salt, such as sodium chlorid or magnesium chlorid, or has such a salt introduced into it from tank 12, there will be indirectly produced from the electric treatment hydroxid of the anode metal. Such hydroxid of the metal, as iron hydroxid, is a flocculant which carries down either coagulated suspended matter or other suspended matter to the bottom of the tank 4 and this iron hydroxid is again introduced into the chamber 2 through pipe 1 and aids the newly forming hydroxid to more rapidly and effectively carry down the suspended matter and in such case the repeated use of the metal hydroxid allows such adjustment of current strength or such reduction of amount of added ionizable salt as effectively to cheapen the treating process and to reduce the period of treatment. Or where the liquid to be treated is acid, neutral or alkaline, it may have introduced into it from the tank 12 a suitable hydroxid, such as calcium hydroxid, sodium hydroxid, potassium hydroxid, or any other material, such as sodium carbonate, as will render the liquid under treatment decidedly alkaline, that is, alkaline to such extent that the effluent through pipe 3 will be alkaline as to phenolphthalein indicator. In such case, with anodes of metal, such as iron or steel, nascent oxygen will be produced in the chamber 2 and little or no hydroxid of the electrode metal will be formed, less being formed in proportion to the greater degree of alkalinity of the liquid. But if the strength of the current through the liquid is increased, some hydroxid of the electrode material may be formed to act as a coagulant or flocculant and then the current may again be reduced to such point that nascent oxygen only is formed without production of metal hydroxid. Then the previously formed hydroxid may be returned from tank 4 repeatedly to the chamber 2 to assist and speed the precipitation of any suspended matter. Or in the case where the liquid is alkaline, as above stated, the current strength may be maintained below that at which hydroxid of the electrode material is formed, and if the liquid contains, for example, carbon dioxid gas or calcium or magnesium bicarbonate, there will be formed, as when calcium hydroxid is introduced, hydrated calcium carbonate which is itself a flocculant and which will precipitate and sedimentize the suspended matter in tank 4, and such flocculant may be re-introduced intermittently or continuously into the tank or chamber 2. Or where the liquid treated is neutral, and metal anodes are used, passage of current will in some cases produce hydroxid of the anode material. In which case this metal hydroxid flocculant operates as above described in tank 4 and is either continuously or intermittently re-introduced into chamber 2. In all cases, however, the settled flocculant or coagulant is used over and over again with resultant cheapening of the process, both as to the amount of current necessary and also in that the complete period of treatment, including electrical treatment and sedimentation, is greatly reduced and shortened. In short, my process consists in electrically treating the liquid, in any desired way, and introducing into the treated or untreated liquid a flocculant or coagulant which has been previously formed and used, such flocculant being either the result of simple chemical reaction in an electrical treating system or the result of decomposition of a metal anode.

If for any reason the electric current should fail, or the supply of re-agent should run out, or if the raw material arriving in pipe 1 should fluctuate as to its content in the absence of an attendant, or if for any other reason the treatment is not sufficient or complete, the valve 21 may be closed and valve 20 opened and the contents of the sedimentation tank 4 may be re-introduced into the electrolytic treating chamber for one or more additional treatments. Thereafter the valve 21 may be opened and valve 20 closed as in normal operation.

In place of returning the coagulant or flocculant to the pipe 1 and the electrical treating apparatus, the same may be returned to the top of tank 4 through pipe 17 controlled by valve 18. Valve 16 may be entirely closed, and with valve 18 open, all of the coagulant or flocculant may be so returned through pipe 17 to the top of tank 4. The valves 18 and 16 may both be partially open in which case the flocculant will in part be returned to pipe 1 in the electrolytic treating apparatus and in part returned directly to the top of tank 4 through pipe 17.

What I claim is:

1. The process of precipitating matter suspended in liquid, which consists in the re-introduction into liquid of a coagulant previously formed in that liquid in the presence of electric current.

2. The process of precipitating matter suspended in liquid, which consists in passing current through liquid, forming coagulant or flocculant in the liquid, sedimentizing the suspended matter with said coagulant or flocculant, and re-introducing said coagulant or flocculant into liquid under electrical treatment.

3. The process of precipitating matter suspended in liquid, which consists in passing electric current through liquid, sedimentizing the suspended matter therein with coagulant or flocculant, and introducing said coagulant or flocculant into raw liquid subjected to electrical treatment therewith.

4. The process of precipitating matter suspended in liquid, which consists in passing electric current through liquid, sedimentizing the suspended matter therein with a coagulant or flocculant, introducing said coagulant or flocculant into raw liquid subjected to electrical treatment therewith, and introducing a part of said sedimentized coagulant or flocculant into liquid subsequent to its electrical treatment.

5. The process of treating liquid, which consists in electrically treating the same and forming flocculant therein, and subjecting the same to previously sedimentized flocculant.

6. The process of treating liquid, which consists in agitating and simultaneously electrically treating the same, and introducing into the liquid previously used flocculant.

7. The process of treating liquid containing a carbonate, which consists in subjecting the same to electric current in the presence of calcium hydrate, whereby flocculant hydrated calcium carbonate is formed from content of the liquid, sedimentizing the matter suspended in said liquid with said flocculant, and re-introducing said flocculant after sedimentation into the liquid.

8. The process of treating liquid, which consists in adding thereto calcium hydrate, passing electric current through said liquid in the presence of a positive metal electrode, adjusting the current strength at will to produce a flocculant hydroxid of the electrode material, producing flocculant hydrated calcium carbonate from reaction of said calcium hydrate with content of said liquid, sedimentizing said flocculants, and re-introducing them into the liquid.

9. The process of precipitating matter suspended in liquid, which consists in re-introducing into liquid a coagulant or flocculant previously formed in that liquid in the presence of electric current, and agitating the liquid containing the re-introduced coagulant or flocculant.

10. The process of precipitating matter suspended in liquid, which consists in passing electric current therethrough, sedimentizing the suspended matter therein with coagulant or flocculant, introducing said coagulant or flocculant into raw liquid, subjecting said coagulant or flocculant to electrical treatment with said raw liquid, and simultaneously agitating said coagulant or flocculant and said raw liquid.

11. The process of treating liquid having matter in suspension therein, which consists in passing electric current through the liquid in the presence of a positive electrode of metal to form a flocculant from the electrode material, sedimentizing the suspended matter in the liquid with said flocculant, reducing the current strength or increasing alkalinity of the liquid so that substantially less or no flocculant of electrode material is formed, and introducing said flocculant into the liquid under electrical treatment.

12. The process of treating liquid having matter in suspension therein, which consists in passing electric current therethrough, thereafter subjecting the liquid to sedimentation with a flocculant, whereby the suspended matter is separated, and re-introducing said flocculant into liquid after its electrical treatment.

In testimony whereof I have hereunto affixed my signature in the presence of the two subscribing witnesses.

CLARENCE P. LANDRETH.

Witnesses:
 NELLIE FIELD,
 ELEANOR T. MCCALL.